United States Patent
Barnea et al.

(10) Patent No.: US 10,913,030 B2
(45) Date of Patent: Feb. 9, 2021

(54) PROCESS FOR REMOVING POLLUTANTS FROM A FLUE GAS

(71) Applicant: Yissum Research Development Company of the Hebrew University of Jerusalem Ltd., Jerusalem (IL)

(72) Inventors: Zach Barnea, Jerusalem (IL); Yoel Sasson, Jerusalem (IL); Benny Bogoslavsky, Jerusalem (IL); Yaakov Mines, Azor (IL)

(73) Assignee: Yissum Research Development Company of the Hebrew University of Jerusalem Ltd., Jerusalem (IL)

( * ) Notice: Subject to any disclaimer, the term of this patent is extended or adjusted under 35 U.S.C. 154(b) by 144 days.

(21) Appl. No.: 16/309,212

(22) PCT Filed: Jun. 13, 2017

(86) PCT No.: PCT/IL2017/050651
§ 371 (c)(1),
(2) Date: Dec. 12, 2018

(87) PCT Pub. No.: WO2017/216788
PCT Pub. Date: Dec. 21, 2017

(65) Prior Publication Data
US 2019/0247789 A1  Aug. 15, 2019

Related U.S. Application Data

(60) Provisional application No. 62/350,198, filed on Jun. 15, 2016.

(51) Int. Cl.
*B01D 53/60* (2006.01)
*B01D 53/64* (2006.01)
(Continued)

(52) U.S. Cl.
CPC .............. *B01D 53/60* (2013.01); *B01D 53/64* (2013.01); *B01D 53/78* (2013.01); *B01D 53/96* (2013.01);
(Continued)

(58) Field of Classification Search
CPC .... B01D 53/14; B01D 53/1493; B01D 53/38; B01D 53/40; B01D 53/46; B01D 53/502;
(Continued)

(56) References Cited

U.S. PATENT DOCUMENTS

2005/0214187 A1   9/2005  Johnson
2006/0239878 A1  10/2006  Lee et al.
(Continued)

FOREIGN PATENT DOCUMENTS

CN   102 824 843 A    12/2012
WO   WO-2009/072113 A2  6/2009

OTHER PUBLICATIONS

Zhao, Y., et al; "Experimental Study on Simultaneous Desulfurization and Denitrification from Flue Gas with Composite Absorbent", Environmental Progress & Sustainable Energy, vol. 30, No. 2, pp. 216-220, Jul. 2011.
(Continued)

*Primary Examiner* — Timothy C Vanoy
(74) *Attorney, Agent, or Firm* — Harness, Dickey & Pierce, P.L.C.

(57) ABSTRACT

A process for removing impurities from a flue gas, comprising treating the flue gas with a liquid absorbent comprising (i) a precursor of chlorine dioxide and (ii) an organic ionic liquid, and releasing a purified flue gas into the atmosphere. The process is useful for removing Hg, $SO_2$ and NOx.

5 Claims, 5 Drawing Sheets

(51) Int. Cl.
  *B01D 53/78* (2006.01)
  *B01D 53/96* (2006.01)
(52) U.S. Cl.
  CPC .... *B01D 2251/108* (2013.01); *B01D 2251/20* (2013.01); *B01D 2252/30* (2013.01); *B01D 2257/602* (2013.01); *B01D 2258/0283* (2013.01); *B01D 2259/124* (2013.01); *Y02A 50/20* (2018.01)
(58) Field of Classification Search
  CPC ........ B01D 53/56; B01D 53/64; B01D 53/78; B01D 2251/10; B01D 2252/30; B01D 2257/302; B01D 2257/404; B01D 2257/602; B01D 2258/0283; B01J 10/00
  See application file for complete search history.

(56) References Cited

U.S. PATENT DOCUMENTS

| | | |
|---|---|---|
| 2010/0011956 A1 | 1/2010 | Neumann et al. |
| 2011/0081286 A1 | 4/2011 | Sasson et al. |
| 2011/0085952 A1* | 4/2011 | Sasson ............... B01D 53/1493 423/210 |
| 2015/0314234 A1 | 11/2015 | Sasson et al. |

OTHER PUBLICATIONS

International Search Report from corresponding PCT Application No. PCT/IL2017/050651, dated Sep. 1, 2017.
Written Opinion of the International Searching Authority from corresponding PCT Application No. PCT/IL2017/050651, dated Sep. 1, 2017.

* cited by examiner

PROCESS FOR REMOVING POLLUTANTS FROM A FLUE GAS

CROSS-REFERENCE TO RELATED APPLICATIONS

This application is a national phase application of PCT Application No. PCT/IL2017/050651, filed on 13 Jun. 2017, which claims priority to U.S. Patent Application No. 62/350,198, filed on 15 Jun. 2016. The entire disclosures of the applications identified in this paragraph are incorporated herein by references.

Flue gases formed by the combustion of fossil fuels, for example, in electric power generating plants, need to be treated in order to remove pollutants and toxic substances prior to the release of the gases into the atmosphere. The most challenging pollutants present in flue gases are elemental mercury) ($Hg^0$), sulfur dioxide ($SO_2$) and oxides of nitrogen ($NO_x$) The emission of the aforementioned pollutants must be minimized in order to comply with increasingly stringent environmental regulations.

The use of chlorine dioxide ($ClO_2$) as an oxidizer of the aforementioned pollutants has been reported. Zhao et al. [Environmental Progress & Sustainable Energy, 30(2), p. 216-220 (2011)] investigated the simultaneous removal of sulfur dioxide and $NO_x$ by means of an aqueous absorbent in which both sodium chlorite and sodium hypochlorite were present. Under acidic conditions, chlorine dioxide is formed in the aqueous absorbent. The authors report that the presence of the hypochlorite species is essential in order to achieve reasonable $NO_x$ removal.

US 2011/0081286 describes an apparatus in the form of a wet scrubber, through which the flue gas flows in upward direction and contacts an ionic liquid coupled to an oxidizer which may be, inter alia, chlorine dioxide. The treated gas stream which exits the scrubber exhibits decreased mercury emission.

The conventional wisdom in the art is that chlorite is transformed into chlorine dioxide in an acidic environment, accelerating the oxidation of nitrogen oxide (NO). However, the resultant oxidation products are not readily absorbed in an acidic solution, and therefore the pH of the solution needs to be carefully adjusted in order to achieve a reasonable level of $NO_x$ removal from the flue gas.

It has now been found that the combination of an aqueous solution of chlorite ($ClO_2^-$) and an ionic liquid can serve as a liquid absorbent, capable of effectively oxidizing and absorbing $Hg^0$, $SO_2$ and $NO_x$. The experimental results reported below indicate that the powerful oxidant chlorine dioxide is formed upon combining together aqueous chlorite and an ionic liquid. Notably, the formation of chlorine dioxide takes place even in the absence of an added acid in the aqueous phase. It is not entirely clear how the presence of the ionic liquid drives the generation of the oxidant. Without wishing to be bound by theory, it is possible that chlorite is converted to some extent into chlorine dioxide, and the chlorine dioxide formed is instantaneously captured by the ionic liquid to form a stable complex, thereby shifting the equilibrium towards further chlorine dioxide generation. It is also possible that acidic components present in the flue gas contribute to the generation of an acidic pH in the aqueous chlorite during operation, namely, when the flue gas is brought into contact with the absorbent, such that chlorine dioxide is continually formed in situ during the purification process.

Regardless of the exact mechanism, the invention provides a liquid absorbent comprising (i) a precursor of chlorine dioxide (preferably in the form an aqueous solution of chlorite ($ClO_2^-$) and (ii) an ionic liquid, wherein the liquid absorbent is preferably acid free. By the term "acid free" is meant an absorbent which prior to use does not contain any acid. However, during the absorption process acids are formed within the liquid absorbent as a result of the contact with the flue gas. The resultant acid(s) are referred to herein as an "indigenously formed acid(s)". According to the preferred embodiment of the invention, in which an aqueous solution of chlorite serves as a source for chlorine dioxide formation, the pH of the liquid absorbent before the initiation of the absorption process is alkaline, e.g., from 7.5-12, and it depends on the chlorite concentration in the aqueous phase and the ratio between the ionic liquid and the aqueous phase. During the absorption of the flue gas, however, the pH gradually decreases to about 2 to 7.

The invention also provides a process for removing pollutants from a flue gas, comprising treating the flue gas with a liquid absorbent comprising (i) a precursor of chlorine dioxide and (ii) an organic ionic liquid and releasing a purified flue gas into the atmosphere, wherein said absorbent is preferably free from an acid other than an indigenously formed acid.

Preferably, the liquid absorbent provided and used according to the invention consists of two substantially immiscible phases. One phase is an aqueous solution comprising chemical precursors of chlorine dioxide, namely, a chlorite ($ClO_2^-$) source. The other phase is provided by the organic ionic liquid. As noted above, it is believed that the in-situ generated chlorine dioxide combines with the ionic liquid to form a stable complex. The oxidation reaction of the pollutants thus takes place in the organic phase. The oxidation products exhibit different solubilities in the two distinct phases. While the oxidized mercury form remains mostly in the organic phase, the products resulting from the oxidation of $SO_2$ and $NO_x$, i.e. the sulfate and/or nitrate ions, which have good water solubility, move from the organic phase to the aqueous phase, from which they can be readily recovered in the form of useful salts.

Accordingly, the process of the invention optionally further comprises the step of recovering sulfate salt, nitrate salt or both from the aqueous component of the liquid absorbent.

The aqueous and organic components of the preferred liquid absorbent of the invention are now described in more detail.

Suitable precursors of chlorine dioxide are preferably aqueous solutions of chlorite salts, e.g., alkali chlorite salts and specifically sodium chlorite ($NaClO_2$). The concentration of the chlorite salt in the solution is preferably from 0.0001 to 2M, more preferably from 0.01 to 0.05M.

With respect to the ionic liquid used in the invention, in its most general form it is an ionic salt with a low melting point, such that it exists in the liquid state at the working temperature of the scrubber (0-90° C.). Ionic salts which are suitable for use according to the invention have a nitrogen-containing cation, e.g., quaternary ammonium cation, namely, $NR_1R_2R_3R_4$ wherein each of $R_1$, $R_2$, $R_3$ and $R_4$ is independently C1-C12 alkyl group (such as methyltrioctyl ammonium). Other suitable cations are positively charged nitrogen-containing rings such as the imidazolium, pyridinium or pyrrolidinium cations in which the nitrogen atom(s) are linked to C1-C12 alkyl groups, such as 1-alkyl-3-methylimidazolium, 1-alkylpyridinium and N-methyl-N-alkylpyrrolidinium, wherein the alkyl group is preferably C2-C12 linear alkyl group, in particular C2-C5 linear alkyl group. The counter ion, namely, the anion of the ionic liquid, is preferably halide or halide-containing anion, such as $BF_4^-$ and $PF_6^-$.

Ionic liquids which are especially suitable for use according to the invention are composed of a cation selected from the group consisting of methyltrioctyl ammonium and 1-alkyl-3-methylimidazolium, (such as 1-butyl-3-methylimidazolium), and an anion which is preferably halide, e.g., chloride or bromide. 1-butyl-3-methylimidazolium salts are abbreviated herein [BMIMX], wherein X indicates the counter ion, e.g., the halide.

The ionic liquids described above are commercially available and can also be synthesized by methods known in the art. For example, methyltrioctyl ammonium is commercially available in the form of its halide salts as Aliquat 336; the halide counter ions can be exchanged using known methods.

The halide nitrogen-containing ionic liquids are generally prepared by reacting the nitrogen-containing moiety with a suitable alkyl halide. Synthetic methods for making halide ionic liquids are described, for example, by Lee at al. [Int. J. of Hydrogen Energy, 33, p. 6031-6036, (2008)] and Wang at al. [Acta Phys.-Chim. Sin., 21(5), p. 517-522 (2005)].

For example, the reaction of 1-methylimidazole with alkyl halide of the formula RX wherein R denotes an alkyl chain (preferably a linear chain) consisting of n carbon atoms (e.g., n is preferably an integer between 2 and 10) and X is chlorine, bromine or iodine, affords the corresponding 1-alkyl-3-methylimidazolium halide salt, as shown by the following reaction scheme:

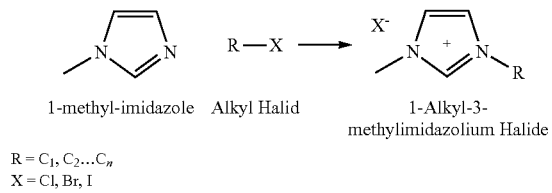

1-methyl-imidazole   Alkyl Halid   1-Alkyl-3-methylimidazolium Halide $R = C_1, C_2...C_n$
$X = Cl, Br, I$ The reactants are used in approximately equal molar amounts, or in a slight molar excess in favor of the alkyl halide. The reactants are gently refluxed at a temperature between 50 and 85° C. for about 24 to 72 hours. The formation of the ionic liquid product is accompanied by an increase at the viscosity of the reaction mixture. Upon completion of the reaction, the resultant ionic liquid is washed with a suitable solvent, e.g., diethyl ether, in order to remove residual amounts of un-reacted starting materials. In this way, an ionic liquid, which is suitable for use in the process of the invention, is obtained.

As noted above, it is preferred to use an ionic liquid which is substantially water-immiscible, e.g., a liquid having solubility in water of not more than 1 g/100 ml, e.g., less than 0.5 g/100 ml, for example less than 0.2 g/100 ml and more specifically less than 0.1 g/100 ml at room temperature (e.g., 20-30° C.). Accordingly, quaternary ammonium halide salts of the formula $NR_1R_2R_3R_4X$, wherein at least two of the $R_i$ groups are long alkyl chains, e.g., C6-C12 alkyl groups, are especially preferred. As an example, the aforementioned methyl trioctyl ammonium halide (Aliquat 336) can be used. However, it should be noted that water-miscible ionic liquids can also be used in combination with the aqueous chlorite phase, in which case liquid-liquid separation methods such as distillation will be employed at the end of the absorption process.

The weight ratio between the aqueous chlorite salt and the ionic liquid is preferably from 1:100 to 10000:1, more preferably 1:25 to 50:1 (for example, 1:5 to 10:1).

The description that follows refers to FIG. 1, which illustrates a flue gas scrubbing apparatus (wet scrubber) which is suitable for removing pollutants such as elemental mercury, $SO_2$ and $NO_x$ from the flue gas, in accordance with the process of the invention. The apparatus comprises a gas-liquid contactor (1), which is typically in the form of a vertically positioned absorber tower, through which a gaseous stream flows in an upward direction. For example, a spray or packed tower may be used as the gas-liquid contactor. The flue gas (2), which typically contains from about 250 to 3500 ppm sulfur dioxide, from about 250 to 500 ppm $NO_x$ and from about 0.1 to 10 ppb mercury, is caused to flow in an upward direction through the tower using a suitable blower (not shown) which operates at conventional throughputs. Optionally, the flue gas is passed through a heat exchanger (not shown) prior to being introduced into the tower, where its temperature is reduced to less than 90° C., e.g., to about 40-60° C.

According to the specific embodiment shown in FIG. 1, the liquid absorbent consists of two essentially immiscible liquids (3a, 3o) which are fed into the upper section (4) of the scrubber by means of two separate streams flowing through two distinct circulation lines (5a, 5o). The circulation is accomplished by discharging the liquid absorbent from the bottom of the wet scrubber (6) and separating the same into an aqueous phase and an organic phase (7), at which point the discharged stream is split up into aqueous and organic streams.

The aqueous stream (5a) is driven by a suitable pump (not shown) and optionally treated to remove water soluble oxidation products therefrom, namely, sulfate and nitrate salts (8). Due to the presence of acidic components in the flue gas, the aqueous stream is slightly acidic and hence the pH of the aqueous stream is controlled and if necessary, adjusted within the range from 6 to 9 by the addition (9) of a base. Fresh chlorite source is periodically added to the aqueous stream prior to its return to the scrubber, preferably by means of injecting an aqueous chlorite solution (10) to the circulating aqueous stream.

The organic stream (5o) obtained following the phase separation consists of the ionic liquid and the oxidized mercury forms. The organic stream is directed to the upper section of the scrubber by means of a suitable pump (not shown). The aqueous and organic streams are combined together (11) and the combined stream is introduced into the scrubber.

The gas-liquid contactor (1) is equipped with a plurality of spray headers (12) mounted in the internal space of the upper section of the tower. Thus, the combined aqueous and organic stream which is driven into the upper section of the tower is dispersed in the internal section of the tower through spray headers (12). The liquid stream flows downward due to the force of gravity. The scrubber is typically provided with suitable fill for increasing the contact between the upwardly flowing gas and the downwardly flowing liquid streams.

As noted above, the absorption liquid is collected at the bottom of the tower, and is circulated through the use of a pumps and separate circulation lines back to the upper section of the tower.

Having been subjected to the scrubbing operation in the absorber tower, the upwardly flowing, purified flue gas exits the tower through a gas outlet opening (13) positioned in the upper section of the tower. A drop separator (not shown)

may be mounted in upper section of the tower, such that the gas permitted to escape from the tower is free of humidity.

Regarding the separation and recovery of the oxidization products, the following methods may be used. As noted above, the oxidized mercury form(s) exhibit high solubility in the ionic liquid. The mercury is liberated from the ionic liquid by the addition of a reducing agent like $NaBH_4$ or $KHCO_2$. The reduction of the oxidized mercury form results in the formation a second liquid phase, consisting of elemental mercury. The two liquids phases (i.e., the ionic liquid and $Hg^0$) are easily separable from one another.

The oxidation products of $SO_2$ and $NO_x$, namely, the sulfate and nitrate ions, exhibit good solubility in the aqueous phase. The aqueous stream may be either treated to recover sulfate or nitrate salts by methods known in the art. In some cases, following the circulation of the absorbent in the scrubber, the gradually increasing concentration of the salts in the aqueous stream may become sufficiently high, such that the aqueous stream can be directly employed for various purposes, e.g., as a potential fertilizer.

The invention therefore provides a process for removing impurities from a flue gas, comprising passing said flue gas through a treatment zone (e.g., provided in the form of a wet scrubber), contacting said flue gas with a circulated liquid absorbent comprising an aqueous chlorite solution and an organic ionic liquid which are immiscible with one another and releasing a purified flue gas into the atmosphere, wherein the circulation of the liquid absorbent comprises discharging the absorbent from the treatment zone after it has been in contact with the flue gas, separating the discharged absorbent into aqueous and organic streams, driving said streams through a first and second circulation lines, respectively, combining the separate aqueous and organic streams and introducing the combined stream back into the treatment zone.

Preferably, sulfate and nitrate are recovered from said first (aqueous) circulation line, into which fresh chlorite is periodically injected. As noted above, the aqueous stream, when sufficiently enriched with the oxidation products, may be also conveyed from said first circulation line to a site of use.

In the drawings:

FIG. 1 provides an illustration of a wet scrubber suitable for carrying out the process according to the invention.

FIG. 2 provides photographs of a mixture of water and aliquat 336 before (A) and after the addition of the chlorite (B).

EXAMPLES

Materials

Sulfur dioxide 5% (w/w) in nitrogen was purchased from Maxima gas supplier, Israel.

Nitrogen oxide 5% (w/w) in nitrogen was purchased from Maxima gas supplier, Israel.

Mercury, Methyl trioctyl ammonium Chloride/bromide, diethyl ether, butyl chloride, butyl bromide, 1-methylimidazole were purchased from Sigma Aldrich, Israel.

Measurements

Mercury concentration was determined using HG-MONITOR 3000 by Seefelder Messtechnik, Germany.

$SO_2$ concentration was determined using a 3SF CiTiceL analyzer from City Technology Ltd, gas analyzer manufactured by Emproco ltd Israel.

$NO_x$ concentration was determined using T2NFF and T3NDH CiTiceL analyzer from City Technology Ltd, gas analyzer manufactured by Emproco ltd Israel.

UV-Vis spectra were obtained using Cary 100 Bio spectrophotometer by Varian.

Gas chromatography (GC) analysis was performed using Trace GC ULTRA manufactured by Thermo with TCD detector, RT Q plot 30 m 0.53 mm ID column and $N_2$ gas as the carrier.

XRD measurements were performed on D8 Advance of Bruker AXS.

Preparations 1-2

Preparation of 1-butyl-3-methylimidazolium Halide (Chloride and Bromide)

1-bromobutane (110 mmol, 15.07 grams) and 1-methylimidazole (100 mmol, 8.21 grams) were added to a 250 mL flask. The reaction mixture was stirred for 48 hours at 80° C. The resulting ionic liquid was then cooled, washed with ether (3×25 mL) to remove unreacted starting materials, and the product was dried under vacuum at 80° C. for 4 hours to afford 1-butyl-3-methylimidazolium bromide [BMIMBr] in a yield of 93% with 96% purity. The procedure was repeated using 1-chlorobutane to give the corresponding chloride.

Example 1

Figure 1:
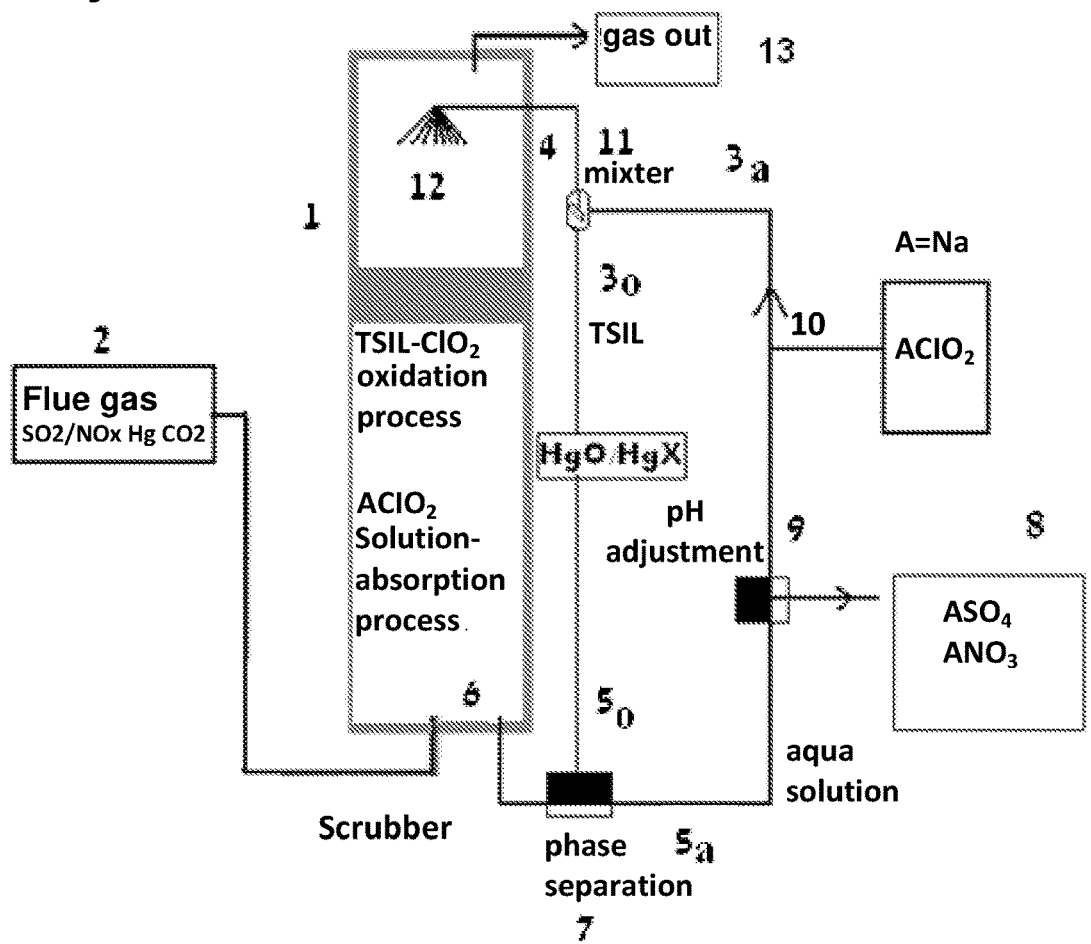
Figure 2:
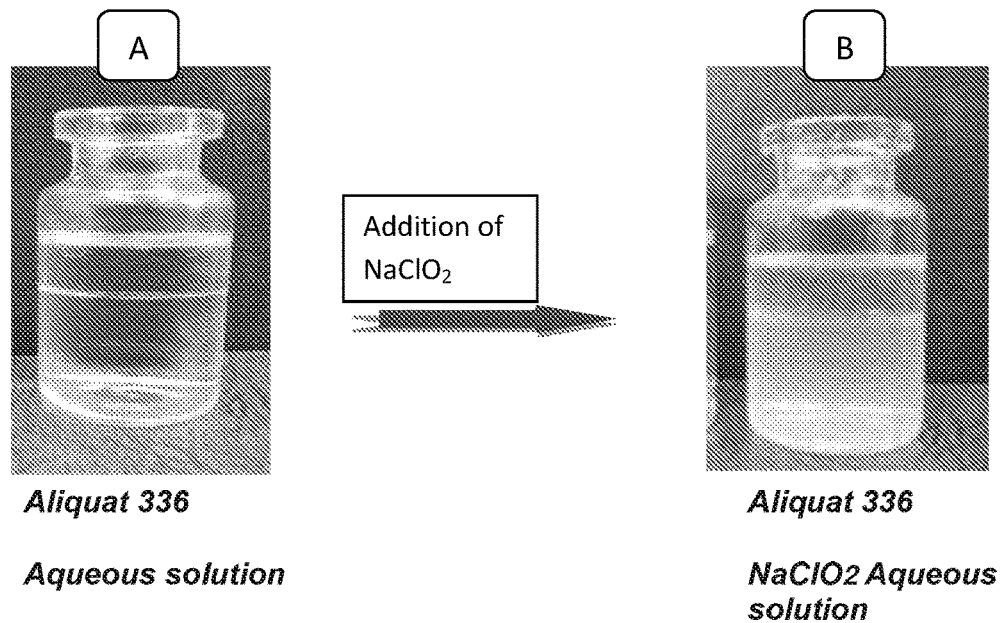

Preparation of a Liquid Absorbent and Identification of Chlorine Dioxide Formed In-Situ in the Absorbent Water and aliquat 336 are added to a flask. A mixture consisting of a lower aqueous phase and an upper organic phase is formed. Sodium chlorite is then added to the flask. The organic phase undergoes a visible color change, exhibiting a strong yellow color indicative of the formation of chlorine dioxide and its complexation in the organic phase. Photographs of the mixture before and after the addition of the chlorite are shown in FIG. 2, designated by the capital letters A and B, respectively. For example, 5 gr of water are mixed with 1 gr of Aliquat 336 (mixture A), followed by the addition of 0.1 gr of sodium chlorite (Mixture B). The color of the upper phase turns from pale yellow to strong yellow. IR analysis confirmed the formation of $ClO_2$ in Mixture B.

Figure 3:
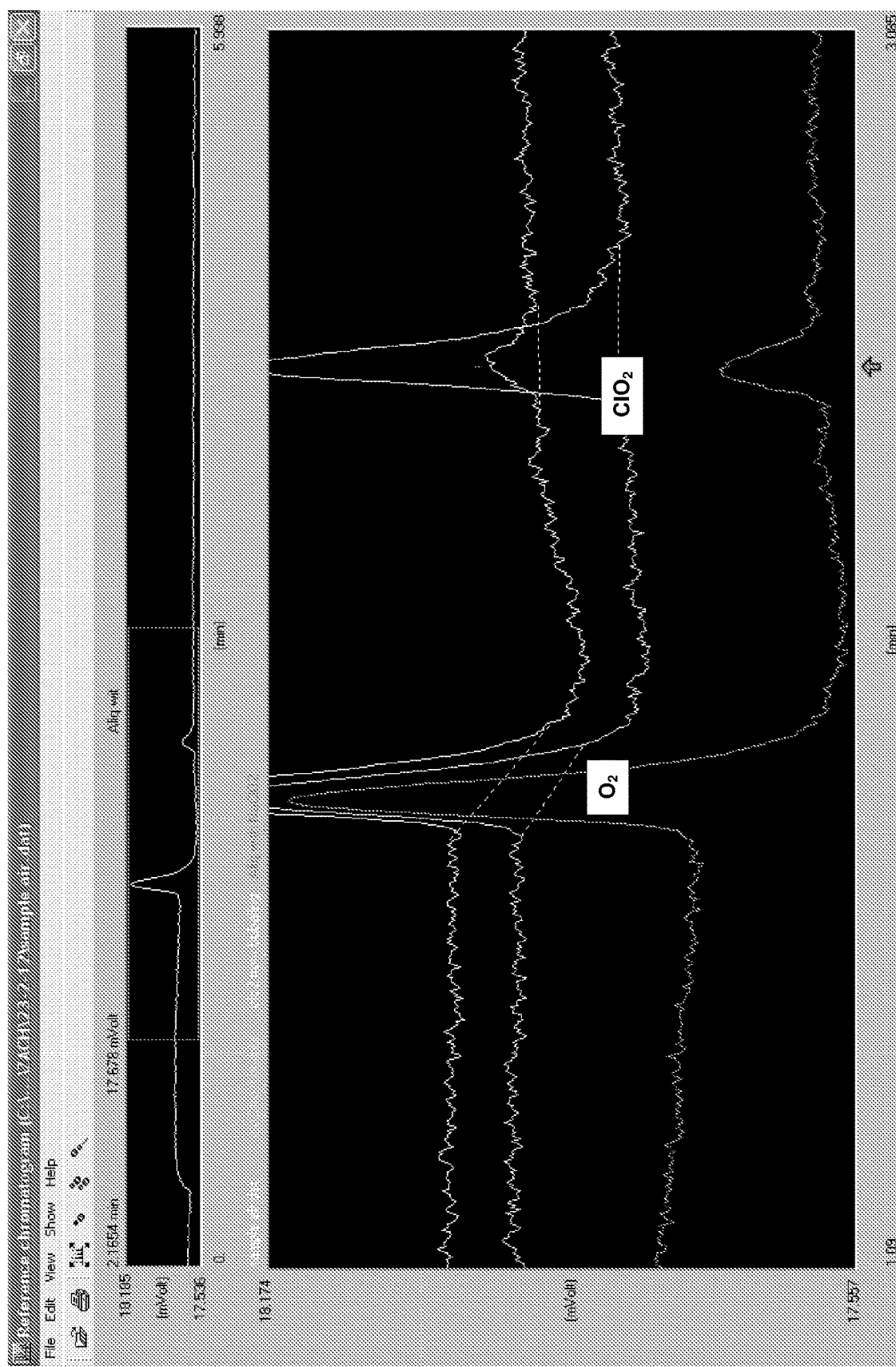
FIG. 3 is a GC chromatogram.

GC is used to qualitatively identify the chlorine dioxide generated in the mixture. The gas liberated upon heating the mixture was subjected to GC analysis and the chromatogram produced in shown in FIG. 3. The retention time of chlorine dioxide is 3.3 min. As indicated by the chromatogram, the reference $ClO_2$ and the gas that was liberated from the mixture during the heating process are the same.

Example 2

Mercury Absorption

Figure 4:
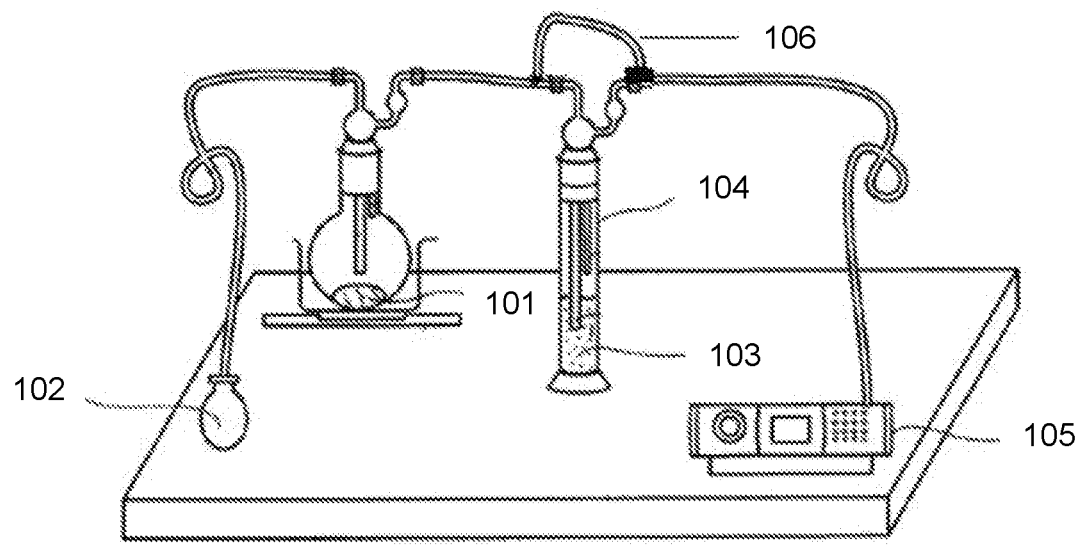
FIG. 4 is a schematic illustration of an experimental set-up used for the measurement of mercury absorption.

FIG. 4 is a schematic illustration of the experimental setup used for the measurement of mercury absorption. An air stream flowing at a constant rate of about 1.5 liter/minute is introduced into a flask 101 which contains elemental mercury. The air stream 102 exiting flask 101, which has been contaminated with mercury vapors, is directed into a gas trap 103 loaded with 12 grams of the liquid absorbent described in Example 1. The outgoing air stream 104 which leaves the gas trap is analyzed by an analyzer 105 for the presence of mercury. The experimental setup includes a bypass 106 through which the mercury-containing air stream 102 is directly conveyed to the analyzer, without being subjected to the treatment with the liquid absorbent in 103.

Figure 5:
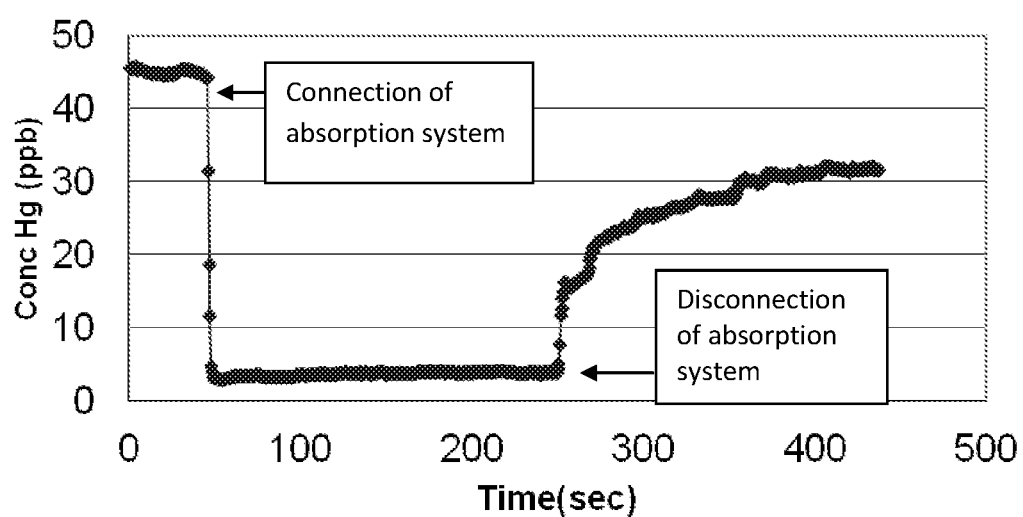
FIG. 5 is a graph showing the results of the experiment for mercury absorption.

The results of the experiment are presented graphically in FIG. 5, in which the concentration of mercury is plotted as a function of time over an interval of about 450 seconds. At the beginning of the experiment the bypass 106 is open. Then, at time $t_1 \cong 50$ seconds the bypass is closed such that the mercury-containing air stream 102 is forced to pass through the liquid absorbent 103. An instantaneous, sharp decrease in the concentration of the mercury in the outgoing air stream 104 is noted. Upon reopening bypass 106 at $t_2 \cong 50$ seconds, the concentration of elemental mercury measured by the analyzer starts increasing again.

Example 3

$SO_2$ Absorption

Figure 6:
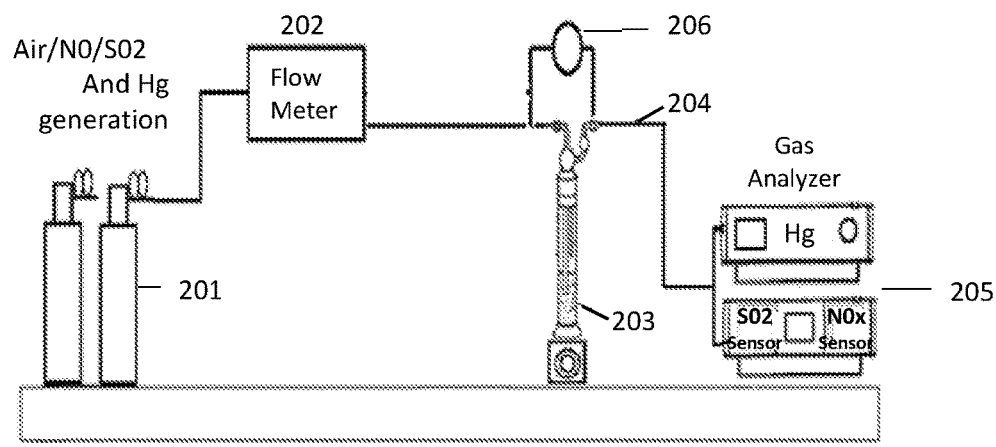
FIG. 6 is a schematic illustration of an experimental set-up used for the measurement of $SO_2$ or NOx absorption.

The experimental setup used in this example is shown schematically in FIG. 6. A mixture of air and sulfur dioxide is made to flow through mass flow controller (by AALBORG) 202 into a gas trap 203 loaded with 12 g of the liquid absorbent of Example 1. The $SO_2$ source 201 was a commercial 5% $SO_2$ gas cylinder (in $N_2$). The flow rates for the air and the 5% $SO_2$ streams were 1 L/minute and 15 ml/minute, respectively. The concentration of $SO_2$ in the outgoing air stream 204 leaving the gas trap was analyzed by analyzer 205. A bypass 206 is also provided, allowing the gaseous mixture to flow directly from the mass flow controller 202 to the analyzer 205, without being subjected to the treatment with the liquid absorbent in 203.

Figure 7:
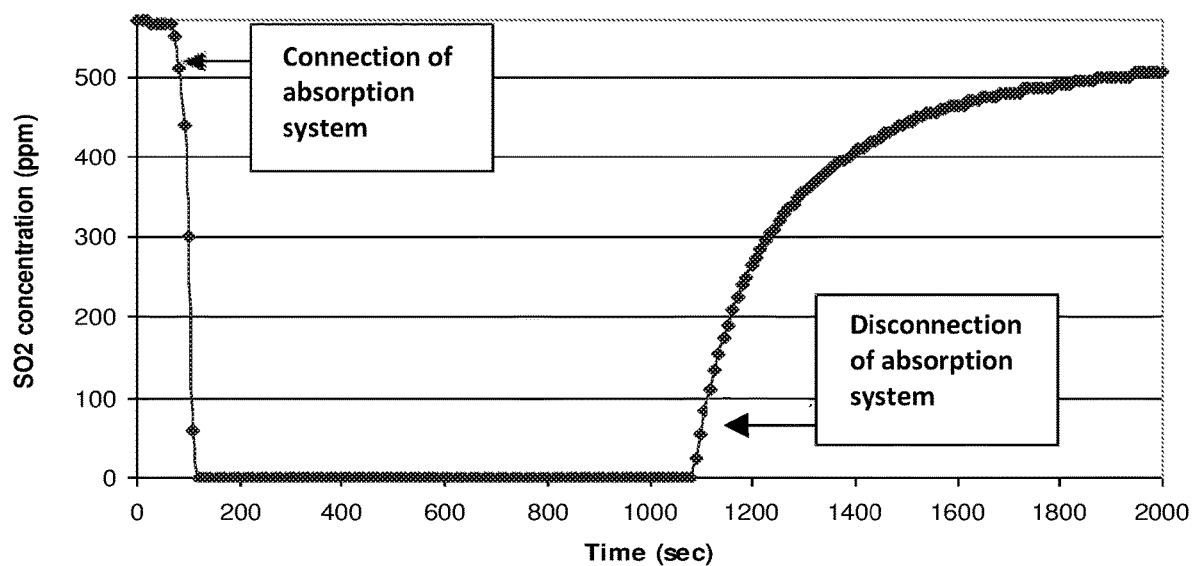
FIG. 7 is a graph showing the results of the experiment for $SO_2$ absorption.

The results are shown in FIG. 7 in the form of a graph in which the concentration of the contaminant sulfur dioxide in the treated, outgoing stream 204 is presented versus time. At the beginning of the experiment the bypass 206 is open. Then, at time $t_1 \cong 100$ seconds the bypass is closed such that the mixed air/$SO_2$ stream is forced to pass through the liquid absorbent in 203. The concentration of sulfur dioxide in the outgoing stream 204 drops almost instantaneously to 0 ppm, indicating $SO_2$ removal efficiency of 100% during the period of time in which the liquid absorbent of the invention was operating (at $t_2$=1100 seconds the bypass 206 is reopened).

The presence of the oxidation product, i.e. the sulfate, in the aqueous phase of the absorbent was confirmed through the addition of calcium chloride. The addition resulted in the formation of a precipitate in the aqueous phase of the absorbent. X-ray powder diffraction analysis confirmed that the precipitate formed is calcium sulfate.

Example 4

$NO_x$ Absorption

The experimental setup shown in FIG. 6 was used also for absorbing nitric oxide from an air stream. To this end, instead of the $SO_2$ cylinder, NO cylinder (5% w/w in nitrogen) was used. The flow arrangement and conditions are as set forth in Example 3.

Figure 8:
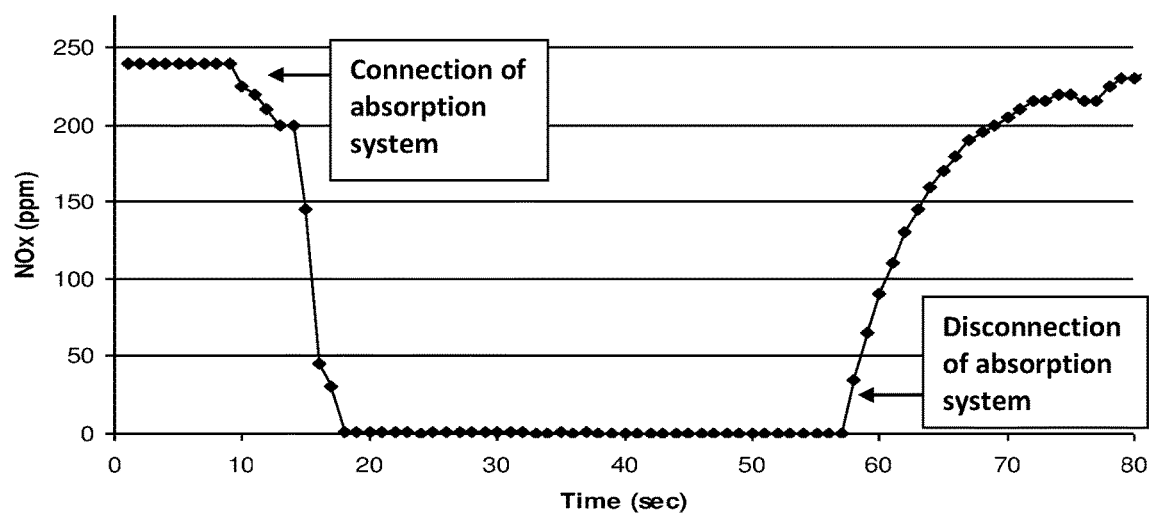
FIG. 8 is a graph showing the results of the experiment for NOx absorption.

The concentration against time curve for the experiment is shown in FIG. 8. A gradual decrease at the concentration of $NO_x$ in the outgoing air stream took place at the time interval between $t_2 \cong 10$ to $t_2 \cong 20$ seconds, following the closure of the bypass. At the time interval between 20 to about 60 seconds, during which the bypass was closed and the air stream was forced to flow through the absorbent, $NO_x$ removal efficiency of 100% was achieved. The increase at the $NO_x$ concentration measured in the outgoing air stream at $t_3 \cong 60$ seconds and afterward is due to the reopening of the bypass.

Figure 9:
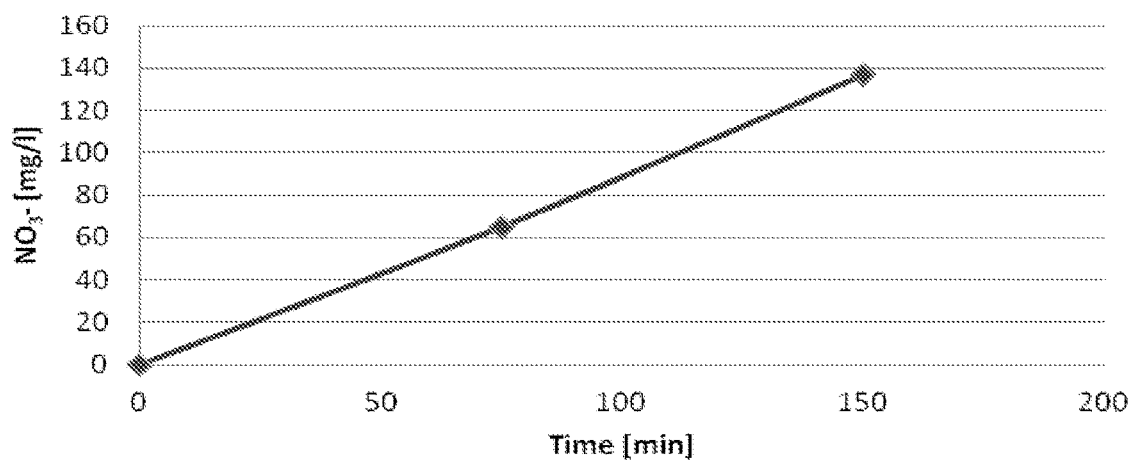
FIG. 9 is a graph showing the results of the experiment for NOx absorption.

The concentration of the oxidation product—the nitrate ion—in the aqueous phase of the absorbent was measured as a function of time and the results are graphically presented in FIG. 9. The concentration versus time curve exhibits linear relationship, indicating the gradual accumulation of the nitrate in the aqueous phase.

The invention claimed is:

1. A process for removing pollutants from a flue gas, comprising
   treating the flue gas with a liquid absorbent comprising (i) a precursor of chlorine dioxide, which is an aqueous solution of chlorite ($ClO_2^-$) and (ii) an organic ionic liquid, wherein the aqueous chlorite and the ionic liquid are essentially immiscible with one another, and
   releasing a purified flue gas into the atmosphere,
   wherein the treatment comprises passing said flue gas through a treatment zone, contacting said flue gas with a circulated liquid absorbent comprising the aqueous chlorite solution and the organic ionic liquid, wherein the circulation of the liquid absorbent comprises discharging the absorbent from the treatment zone after it has been in contact with the flue gas, separating the discharged absorbent into aqueous and organic streams, driving said streams through a first and second lines, respectively, combining the separate aqueous organic streams and introducing the combined streams back into the treatment zone.

2. A process according to claim 1, wherein the absorbent is free from an acid other than an indigenously formed acid.

3. A process according to claim 1, wherein the pollutant is selected from the group consisting of $Hg^0$, $SO_2$, $NO_x$ and mixtures thereof.

4. A process according to claim 3, which further comprises recovering sulfate and/or nitrate from the aqueous stream flowing through the first circulation line or directing said aqueous stream to a site of use.

5. A process according to claim 1, which further comprises injecting fresh chlorite into the first circulation line.

* * * * *